United States Patent [19]
Sako

[11] Patent Number: 5,325,347
[45] Date of Patent: Jun. 28, 1994

[54] DATA RECORDING METHOD AND DATA REPRODUCING APPARATUS WITH CONTIGUOUS DATA RECORDING

[75] Inventor: Yoichiro Sako, Chiba, Japan

[73] Assignee: Sony Corporation, Tokyo, Japan

[21] Appl. No.: 762,016

[22] PCT Filed: Jan. 18, 1991

[86] PCT No.: PCT/JP91/00054

§ 371 Date: Sep. 19, 1991

§ 102(e) Date: Sep. 19, 1991

[87] PCT Pub. No.: WO91/11002

PCT Pub. Date: Jul. 25, 1991

[30] Foreign Application Priority Data

Jan. 19, 1990 [JP] Japan .................. 2-8513

[51] Int. Cl.⁵ .................. G11B 7/00
[52] U.S. Cl. .................. 369/48; 358/342; 360/19.1; 360/35.1; 369/54
[58] Field of Search .................. 369/47, 48, 50, 54, 369/45, 58, 59, 13; 360/114, 19.1, 59, 35.1, 8; 358/342, 343

[56] References Cited

U.S. PATENT DOCUMENTS

| | | | |
|---|---|---|---|
| 4,733,385 | 3/1988 | Henmi et al. | 360/59 |
| 4,809,087 | 2/1989 | Shimeki et al. | 360/19.1 |
| 4,816,928 | 3/1989 | Sasaki et al. | 360/19.1 |
| 4,860,272 | 8/1989 | Nishikawa et al. | 369/48 |
| 4,982,390 | 1/1991 | Tanaka | 360/30 |
| 5,081,538 | 1/1992 | Takei et al. | 360/19.1 |
| 5,099,464 | 3/1992 | Maeda | 369/54 |
| 5,130,816 | 7/1992 | Yoshio | 369/59 |
| 5,214,631 | 5/1993 | Maeda et al. | 369/59 |
| 5,224,087 | 6/1993 | Maeda et al. | 369/47 X |

FOREIGN PATENT DOCUMENTS

| | | |
|---|---|---|
| 0155970 | 10/1985 | European Pat. Off. . |
| 0196590 | 10/1986 | European Pat. Off. . |
| 0429139 | 5/1991 | European Pat. Off. . |
| 34-4372 | 5/1959 | Japan . |
| 52-20129 | 1/1977 | Japan . |
| 59-8882 | 2/1984 | Japan . |
| 1-251368 | 10/1989 | Japan . |
| 2136192 | 9/1984 | United Kingdom . |

*Primary Examiner*—Andrew L. Sniezek
*Assistant Examiner*—Thang V. Tran
*Attorney, Agent, or Firm*—Hill, Steadman & Simpson

[57] ABSTRACT

The present invention provides a recording method and a reproducing method for compressed data which are continuous data compressed in time. The methods may be applied advantageously to data recording and reproduction on or from a disc-shaped recording medium. Data recording is performed in such a manner that a predetermined amount of compressed data stored in a memory are read out continuously and recorded on a recording medium, and recording on the recording medium is discontinued during the time which elapses since recording of the predetermined amount of the compressed data until storage in and readout from the memory of a new predetermined amount of the compressed data. On the other hand, data reproduction is performed in such a manner that readout of the compressed data from the recording medium is discontinued during the time which elapses since a predetermined amount of the compressed data is read out from the recording medium on which data compressed in time are recorded until data expanded in time are read out.

23 Claims, 6 Drawing Sheets

| SYSTEM | SOUND QUALITY LEVEL | 16 SECTORS | REPRODUCING TIME | |
|---|---|---|---|---|
| ADPCM | A LEVEL STEREO | ▨▨▨□▨▨▨□▨▨▨□▨▨▨□ | 2HOURS | |
| ADPCM | A LEVEL MONAULAL | ▨□□□▨□□□▨□□□▨□□□ | 4HOURS | |
| ADPCM | B LEVEL STEREO | ▨□□□▨□□□▨□□□▨□□□ | 4HOURS | CD-ROM XA |
| ADPCM | B LEVEL MONAULAL | ▨□□□□□□□▨□□□□□□□ | 8HOURS | |
| ADPCM | C LEVEL STEREO | ▨□□□□□□□▨□□□□□□□ | 8HOURS | |
| ADPCM | C LEVEL MONAULAL | ▨□□□□□□□□□□□□□□□ | 16HOURS | |
| PCM | CD-DA | ▨▨▨▨▨▨▨▨▨▨▨▨▨▨▨▨ | 62～75MIN. | |

CD-I FORMAT

FIG.1
(PRIOR ART)

DATA RECORDING METHOD AND DATA REPRODUCING APPARATUS WITH CONTIGUOUS DATA RECORDING

TECHNICAL FIELD

This invention relates to a recording method and a reproducing apparatus for compressed data which are continuous data compressed in time. More particularly, it relates to a method for continuously recording data on a disc-shaped recording medium which is rotationally driven at a velocity higher than the rotational velocity of a disc corresponding to the transfer rate of recording data, and a method for reproducing data continuously recorded on the disc-shaped recording medium.

BACKGROUND ART

Conventionally, in a disc apparatus, such as a CD player for reproducing a compact disc (DC) having concentric tracks in which digital audio data are recorded as a train of pits, a laser beam is irradiated along a track on the disc driven by a spindle motor at a constant linear velocity (CLV), and the digital audio data are reproduced by detecting changes in the intensity of the reflected light caused by the presence or absence of the pits.

Although the bit error rate during data reproduction may reach a value in an order of $10^{-5}$, an error correcting operation is performed with the acid of error detection and error correction codes to obviate any inconveniences which might otherwise arise under usual operating environments.

Meanwhile, in a CD player provided with an optical reproducing head, it is a frequent occurrence that the servo systems such as the focusing servo or tracking servo for the reproducing head is out of order so that regular data playback cannot be achieved. In such case, error correction cannot be made even with the use of the error detection or error correction code, so that data playback is discontinued transiently.

In a car-laden or portable CD player, which may be subjected to extremely large impacts or vibrations in a manner different from a stationary CD player for domestic use, a mechanical vibration proofing system is provided to prevent the servo system from falling into disorder in the above described manner.

On the other hand, in a so-called CD-I(CD-Interactive) system in which video data and letter or character data are recorded simultaneously on the compact disc (CD) in addition to the audio information, seven modes as shown in FIG. 1 are standardized as audio information.

In the CD-DA mode in which the sound quality level corresponds to the current 16-bit PCM, linear pulse code modulation (PCM) with the sampling frequency of 44.1 Khz and the number of bits of quantization equal to 16, is employed. In the A level stereo mode and the A level monaural mode having the sound quality corresponding to the long-playing record, adaptive differential pulse code modulation (ADPCM) with the sampling frequency of 37.8 kHz and the number of bids of quantization equal to 8, is employed. In the B level stereo mode and the B level monaural mode having the sound quality corresponding to FM broadcasting, ADPCM with the sampling frequency of 37.8 kHz and the number of bits of quantization equal to 4, employed. Finally, in the C level stereo mode and the C level monaural mode, having the sound quality corresponding to the AM broadcasting, ADPCM with the sampling frequency of 18.9 Khz and the number of bits of quantization equal to 4, is employed.

That is, turning to FIG. 1, in the A level stereo mode, as contrasted to the CD-DA mode, the bit reduction ratio is ½ and data are recorded at every two sectors (represents a sector where data recording in made) with the reproducing time for a disc being about two hours. In the A level monaural mode, the bit reduction rate is ¼ and data are recorded at every four sectors, with the reproducing time being about four hours. In the B level monaural mode, the bit reduction ratio is ⅛ and data are recorded at every eight sectors, with the reproducing time being about eight hours. In the C level stereo mode, the bit reduction ratio is ⅛ and data are recorded at every eight sectors, with the reproducing time being about eight hours. In the C level monaural mode, the bit reduction ratio is 1/16 and data are recorded at every sixteen sectors, with the reproducing time being about sixteen hours.

Heretofore, the rotational velocity of the disc in each of the above modes is the same, that is, the transfer rate of recordable data per second on the transfer rate of reproducible data per second is 75 sectors. When recording audio data on a disc in the B level stereo mode, for example, the data transfer rate in the B level stereo mode is 18.75 (75÷4) sectors/second, audio data are discretely recorded at every four sectors, from the first sector of the innermost track towards the outermost track on the sector-by-sector basis and, after audio data are recorded on the outermost track, audio data are again recorded at every four sectors from the second sector of the innermost track towards the outermost track. That is, audio data are recorded on the disc from the innermost track towards the outermost track, from the innermost track towards the outermost track, from the innermost track towards the outermost track and from the innermost track towards the outermost track. Thus, during reproduction, data are not reproduced when the reproducing head jumps (or reverts) from the outermost track towards the innermost track, so that reproduction of a piece of music is discontinued.

There has hitherto been provided a disc recording apparatus adapted for recording digital data conforming to the above described CD or CD-I standard on a write-once optical disc or overwrite type magneto-optical disc. However, with such disc recording apparatus, the servo system for focusing servo or tracking servo of the recording head tends to be disengaged or out of order due to mechanical disturbances, such as vibrations or impacts, such that recording is discontinued transiently.

In view of the above described status of the conventional disc apparatus, it is an object of the present invention to provide a data recording method in which the rotational velocity of the disc remains the same for each mode, in which data may be recorded continuously on a track of the disc which is rotated at a rotational velocity faster than the rotational velocity corresponding to the data transfer rate, when the rotational velocity of the disc is faster than the rotational velocity corresponding to the data transfer rate, as in data recording in the B level stereo mode, and in which continuous data reproduction may be made at the time of data reproduction. It is another object of the present invention to provide a data recording method in which data may be recorded continuously on a recording track of the disc-shaped recording medium even though the servo system is in trouble due to disturbances.

It is a further object of the present invention to provide a data reproducing method in which data continuously recorded on a track of a disc rotated at a rotational velocity faster than the rotational velocity corresponding to the data transfer rate may be reproduced at a predetermined data transfer rate. It is a further object of the present invention to provide a data reproducing method in which data may be continuously reproduced from a recording track on a disc-shaped recording medium even though the servo system is in trouble due to disturbances.

DISCLOSURE OF THE INVENTION

In a data recording method of the present invention, when recording data on a recording medium, compressed data, which are continuous data compressed in time, are stored in memory means, a predetermined amount of the compressed data stored in the memory means are read out and supplied to a recording head to effect data recording on the recording medium. During the time which elapses since recording of the predetermined amount of the compressed data is terminated until a new predetermined amount of the compressed data is stored in and read out from the memory means, data recording on the recording medium is discontinued. Thus, with the data recording method of the present invention, compressed data compressed in time may be recorded on the recording medium as continuous recording data.

On the other hand, in a data reproducing method according to the present invention, when data are reproduced from a recording medium on which compressed data compressed in time are recorded continuously, the compressed data are read out from the recording medium by scanning the recording medium by the reproducing head, and the read-out compressed data are expanded in time before being outputted continuously. During the time which elapses since the read-out compressed data are expanded in time and outputted continuously to read out a predetermined amount of the compressed data until the reproduced data expanded in time are completely outputted, reading of the compressed data from the recording medium is discontinued. Thus, with the data reproducing method for the disc apparatus according to the present invention, compressed data continuously recorded on a disc rotationally driven at a rotational velocity faster than the rotational velocity of the disc corresponding to the data transfer rate for reproduced data may be continuously reproduced from the disc at a predetermined data transfer rate.

BRIEF DESCRIPTION OF THE DRAWINGS

FIG. 1 is a view showing a data construction for CD-I.

Best Embodiment for Practicing the Invention

Figure 2:
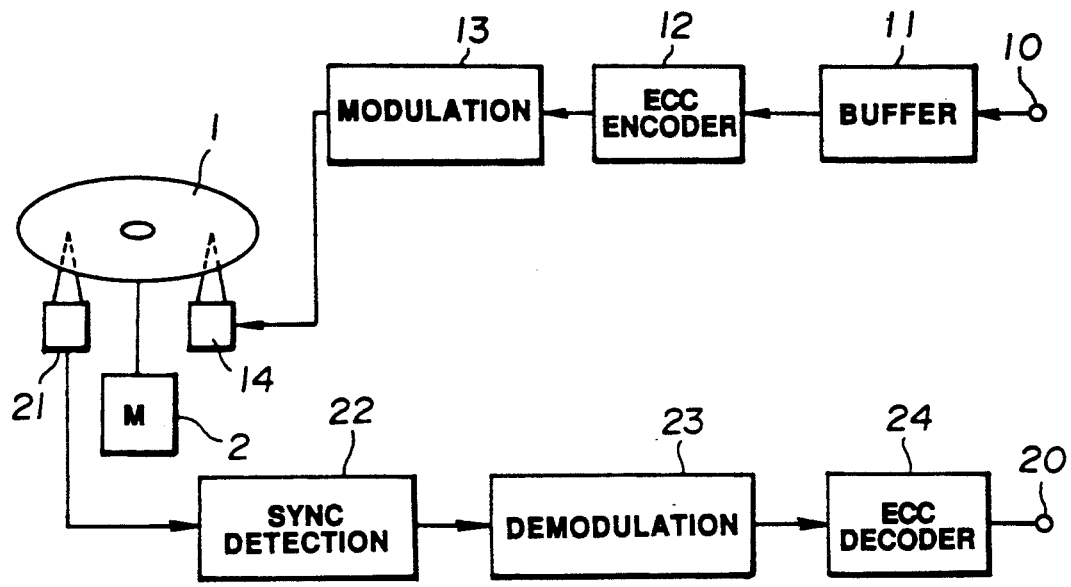
FIG. 2 is a block circuit diagram showing a construction of an optical disc apparatus for practicing the inventive method.

By referring to the drawings, the method for recording data and the method for reproducing data embodying the present invention will be explained hereinbelow.

FIG. 2 is a block circuit diagram for illustrating a construction of an optical disc apparatus for practicing the invention.

The method for recording data with the aid of a data recording system of the optical disc apparatus according to the present invention will first be explained.

Referring to FIG. 2, a disc 1 is an overwritable optical disc, such as a magneto-optical disc. The disc 1 is rotationally driven by a spindle motor 2 at an angular velocity corresponding to 75 sectors/second which is a data transfer rate of the CD-DA mode in the above described CD-I data format.

To a terminal 10 is supplied an audio information of the B-level stereo mode in the CD-I data format, modulated by ADPCM, referred to hereinafter as the recording data. That is, the recording data are inputted at a data transfer rate of 18.75 (75÷4) sectors/second.

A buffer circuit 11, connected to the terminal 10, is a memory for storing data of, for example, one track, and stores the recording data for one track at a rate of 18.75 sectors/second, while outputting the stored one-track data to an ECC encoder 12 in a burst fashion at a rate of 75 sectors per second.

The ECC encoder 12 is a so-called ECC (error correcting code) encoder, for example, and adds an error detection code or an error correction code, such as parity bits, for error correction at the time of data reproduction, while outputting the encoded data to a modulation circuit 13.

The modulation circuit 13 is a so-called 4/15 (4 out of 15) modulator, for example, and outputs modulated signals to a recording head 14.

The recording head 14 is an optical head for a magneto-optical disc, for example, and irradiates a laser beam on a recording surface of the disc while modulating the orientation of a magnetic field applied to the recording surface by using a signal from the modulation circuit 13. In other words, the recording head records the recording data along the track by so-called photothermal magnetic recording.

Figure 3:
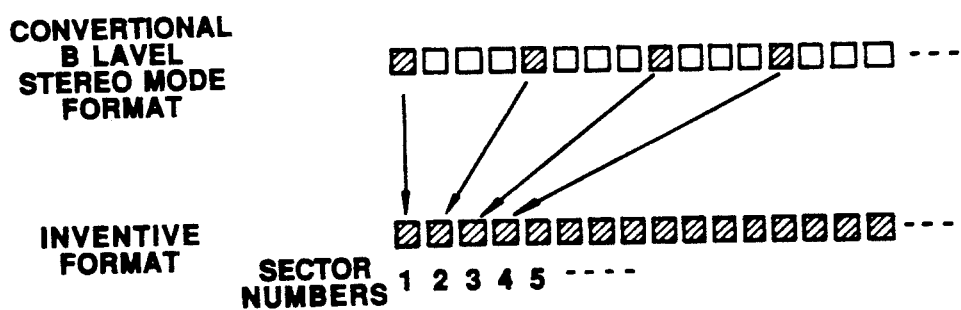
FIG. 3 shows an example of a construction of data recorded on a disc by the optical disc apparatus shown in FIG. 2.

With the above described data recording system, since the disc 1 is rotationally driven at an angular velocity corresponding to four times the recording data transfer rate, the one-track recording data stored in the buffer circuit 11 are continuously recorded on the disc 1 during each full revolution of the disc 1, while the recording head 14 continues to scan the same track without performing a recording operation, that is in an idling state, during the time when the disc 1 performs the remaining three revolution. That is, in contrast to the conventional data format, shown in FIG. 3, in which data are recorded at every four sectors, data are recorded continuously so that there is no sector in which data are not recorded. As a result, it becomes possible to record the recording data continuously on the track of the disc 1.

Meanwhile, when the audio information in the above mentioned B-level monaural mode is supplied by means of terminal 10, the recording data transfer rate inputted at the terminal 10 is 9.375 (75÷8) sectors/second, and data are stored with the recording head 14 scanning the same track seven times in the idling state. With the C-level stereo mode, for example, data storage is made with the recording head 14 scanning the same track seven times in the idling state. For other modes, data recording is similarly performed by changing the number of times the recording head 14 scans the same track in the idling state as a function of the data transfer rates. In other words, data having different transfer rates may be continuously recorded using the same rotational velocity of the disc.

As described hereinabove, by rotationally driving the disc 1 at a rotational velocity faster than the rotational velocity of the disc corresponding to the transfer rate of the recording data inputted at the terminal 10, and by having the recording head 14 scan the same track during the time period other than that in which the recording head 14 is recording data, data may be continuously recorded on the track of the disc and the reproducing head may be prevented during data playback from jumping from the outermost track to the innermost track as described hereinabove to reproduce a continuous piece of music as an example.

Next, the method for data reproduction with the aid of a data reproducing system of the optical disc apparatus will be explained.

With the data reproducing system, the disc 1, on which the B-level stereo mode audio information (recording data) is continuously recorded, as described hereinabove, is rotationally driven by the spindle motor 2 at an angular velocity corresponding to 75 sectors/second, which is the data transfer rate in the above mentioned CD-I CD-DA mode, as in the case of data recording.

A reproducing head 21 is composed of, for example, optical components, such as laser diode, collimator lens, object lens, beam splitter or cylindrical lens, split photodetectors and an RF amplifier of a matrix configuration, and adapted for irradiating a laser beam on a track of the disc 1 for reproducing data playback signals by means of photomagnetic effects such as so-called Kerr effects, while detecting focusing error signals by a so-called astigmatic method and also detecting tracking error signals by means of a so-called push-pull method. These focusing and tracking error signals are used for focusing servo control for maintaining a constant distance between the object lens of the reproducing head 21 and the recording surface of the disc 1 and for tracking servo control for assuring accurate track scanning by the laser beam from the reproducing head 21.

A synchronization detection circuit 22, connected to the reproducing head 21, renders the playback signals from the reproducing head 21 into a binary form, reproduces clock signals recorded on the disc 1, detects synchronization signals with the aid of clocks and the signals rendered in the binary form for synchronization, and reproduces pre-modulation data to output the data to a demodulation circuit 23.

The demodulation circuit 23 demodulates data from synchronization detection circuit 22 by, for example, 4/15 modulation, and outputs the demodulated data at an ECC decoder 24.

The ECC decoder 24 is an ECC (error correcting code) decoder and corrects for errors in data demodulated from the demodulator 23 to form reproduced data and outputs error-corrected playback data at a terminal 20 at a data transfer rate of 18.75 sectors/second.

With the above described data reproducing system, since the disc 1 is rotationally driven at an angular velocity corresponding to four times the data transfer rate for the playback data, the reproducing head 21 scans the same track four times to reproduce one-track data four times. The one-track playback data are outputted at a terminal 20 from the data reproduced four times from the same track at a predetermined data transfer rate of 18.75 sectors/second.

Meanwhile, if the audio information of the above mentioned B level monaural mode is continuously recorded on the disc 1, the disc 1 is rotationally driven at an angular velocity equal to eight times the transfer rate for playback data, so that the reproducing head 21 scans the same track eight times to reproduce one-track data eight times. From the data obtained by reproducing the same track eight times, one-track playback data are outputted at a terminal 20 at a predetermined data transfer rate of 9.375 (75÷8) sectors/second. In the case of the C level stereo mode, the reproducing head 21 scans the same track eight times and outputs the one-time playback data at the terminal 20 at a predetermined data transfer rate of 9.375 sector/second. For other modes, one-time playback data are outputted at a predetermined data transfer rate by changing, as a function of the occasional data transfer rates, the number of times the reproducing head 21 repeatedly scans the same track. In other word's, data with different data transfer rates may be reproduced by using the same rotational velocity of the disc.

As described hereinabove, by rotationally driving the disc 1 at a rotational velocity faster than the rotational velocity corresponding to the transfer rate of playback data outputted at the terminal 20, by having the reproducing head 21 scan the same disc track a plural number of times to reproduce one track data a plural number of times, and by outputting playback data for one reproducing operation from the playback data at a predetermined data transfer rate, data may be reproduced at a predetermined data transfer rate to enable continuous reproduction of a piece of music, as an example.

It is to be noted that the present invention is not limited to the above described embodiment, but may naturally be applied to, for example, a reproducing system for a so-called once write type optical disc apparatus, magnetic disc apparatus, so-called read-only CD apparatus or CD-ROM apparatus. The present invention may also be applied to an apparatus adapted for rotationally driving a disc at a constant linear velocity.

As described hereinabove, with the optical disc apparatus shown in FIG. 2, by rotationally driving the disc at a rotational velocity faster than the rotational velocity corresponding to the data transfer rate for the recording data and by having the recording head scan the same track during the time period other than the time period when the recording head is recording data on the disc track, the recording data may be continuously recorded on the track, so that, during data reproduction, a continuous piece of music, for example, may be reproduced without the reproducing head jumping from the outermost track to the innermost track, as in necessary in the conventional apparatus.

On the other hand, when reproducing the data which have been recorded continuously, as described above, by rotationally driving the disc at a rotational velocity faster than the rotational velocity of the disc corresponding to the transfer rate for the playback data, by having the reproducing head scan the same disc track a number of times, by reproducing data corresponding to the plural number of times of the reproducing operations and outputting data corresponding to one of the reproducing operations from the reproduced data at a predetermined data transfer rate, data reproduction may be achieved at a predetermined data transfer rate, so that a piece of music may be reproduced continuously, without the reproducing head jumping from the outermost track to the innermost track, as is necessary in the conventional apparatus.

A modified method of the present invention, practiced by using a disc recording/reproducing apparatus, constructed as shown in a block circuit diagram shown in FIG. 4, will be explained in detail.

Figure 4:
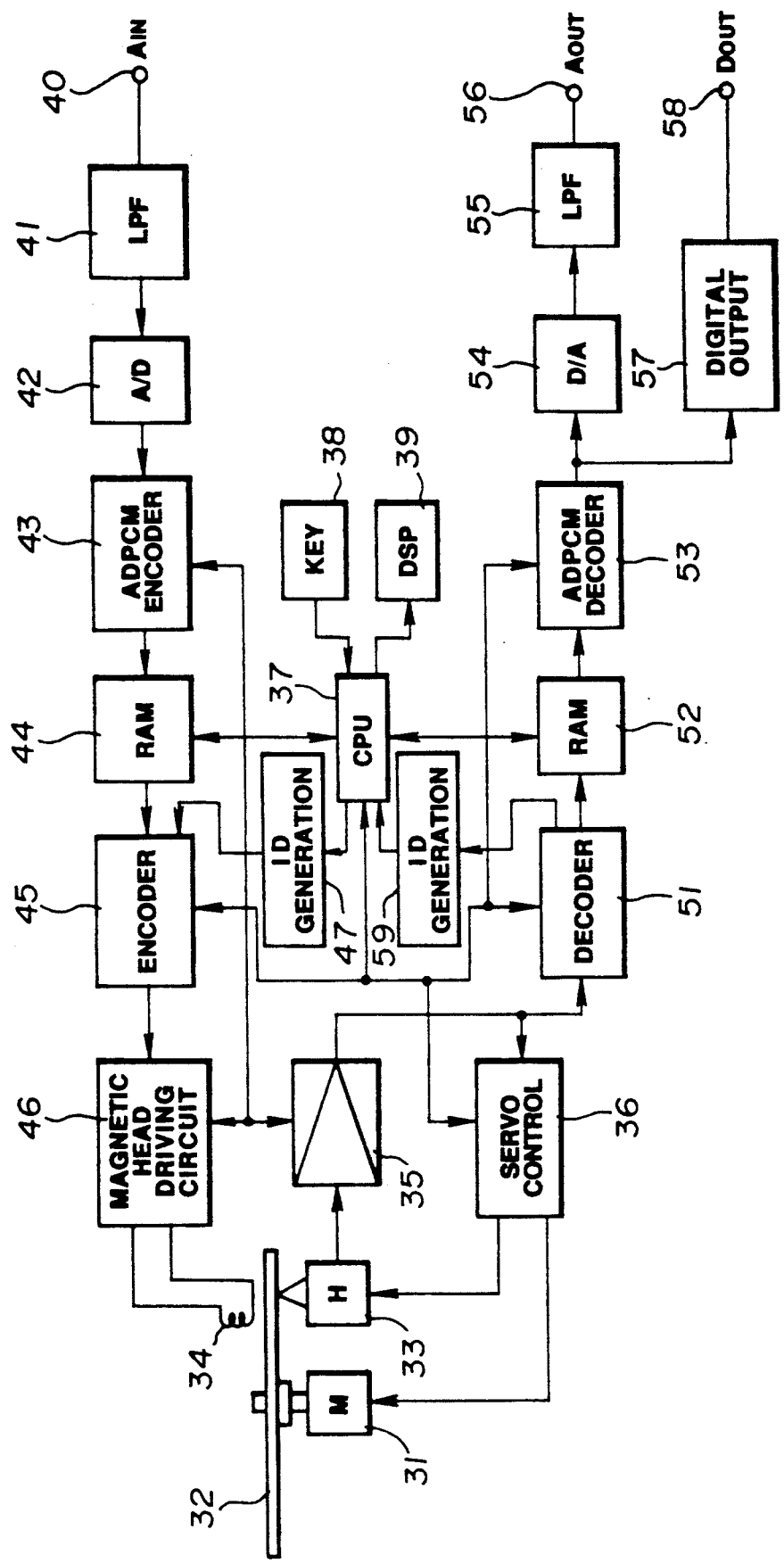
FIG. 4 is a block circuit diagram showing a construction of a disc recording/reproducing apparatus for practicing the inventive method.

Referring to FIG. 4, the disc recording/reproducing apparatus includes, as a recording medium, a magneto-optical disc 32, rotationally driven by a spindle motor 31. With the laser beam irradiated on the magneto-optical disc 32 by means of an optical head 33, a magnetic field modulated in accordance with the recording data is applied by a magnetic head 34 for recording data along a recording track on the magneto-optical disc 32, or reproducing the recorded data by tracing the recording track of the magneto-optical disc 32 by the laser light by means of the optical head 33.

The optical head 33 is constituted by a laser light source, such as a laser diode, optical components, such as a collimator lens, object lens, polarization beam splitter or a cylindrical lens, and split photodetectors, and is arranged in opposition to the magnetic head 34 with the magneto-optical disc 32 in-between. When recording data on the magneto-optical disc 32, the magnetic head 34 is driven by a head driving circuit 46 of a recording system as later described to apply a magnetic field modulated in accordance with recording data, at the same time that the optical head 33 irradiates a laser light on a target track of the disc 32 to effect data recording by thermomagnetic recording. The optical head 33 detects the reflected laser light from the irradiated target track to detect the focusing error by the so-called astigmatic method, while detecting tracking errors by a so-called push-pull method. The optical head 33 also detects, when reproducing data from the magneto-optical disc 32, the difference in the polarization angle (Kerr rotation angle) of the reflected laser light from the target track to generate playback signals.

The output from the optical head 33 is supplied to an RF circuit 35, which RF circuit extracts the focusing error signals or the tracking error signals from the output of the output head 33 to supply the extracted signals to a servo control circuit 36. The circuit 35 also renders the playback signals into the binary form and supplies the binary signals to a decoder 51 of a reproducing system, as later described.

The servo control circuit 36 is constituted by, for example, a focusing servo control circuit, a tracking servo control circuit, a spindle motor servo control circuit and a thread servo control circuit. The focusing servo control circuit effectuates focusing control of an optical system of the optical head 33 so that the focusing error signal is reduced to zero. The tracking servo control circuit effects tracking control of the optical system of the optical head 33 so that the tracking error signal is reduced to zero. The spindle motor servo control circuit controls the spindle motor 31 so that the magneto-optical disc 32 is rotationally driven at a rotational velocity corresponding to a predetermined transfer rate (75 sectors/second) corresponding to the CD-DA mode of the above mentioned CD-I system. The thread servo control circuit shifts the optical head 33 and the magnetic head 34 to a target track position on the magneto-optical disc 32 designated by a system controller 37. The servo control circuit 36, taking charge of these various control operations, supplies data indicating the operating states of the components controlled by the servo control circuit 36 to the system controller 37.

A key entry section 38 and a display section 39 are connected to the system controller 37. The system controller 37 controls the recording system and the reproducing system by an operational mode designated by input data at the key entry section 38. The system controller 37 supervises, on the basis of the sector-by-sector address information reproduced from the recording track on the magneto-optical disc 32 by header timer or sub-Q data, the recording position or the playback position on the recording track as traced by the optical head 33 and the magnetic head 34, while supplying timing data corresponding to the recording position or the playback position to the display section 39 for displaying the recording time or the reproducing time in the display section 39.

The recording system of the disc recording-reproducing system is provided with an A/D converter 42 to which analog audio signals $A_{IN}$ are supplied from an input terminal 40 by means of a low-pass filter 41.

The A/D converter 42 quantizes the audio signal $A_{IN}$ to form digital audio data of a predetermined transfer rate (75 sectors/second) corresponding to the CD/DA mode in the above mentioned CD-I system. The digital audio data, obtained by the A/D converter 42, are supplied to an ADPCM encoder 43.

The ADPCM encoder 43 processes the digital audio data of the predetermined transfer rate, quantized from the audio signals $A_{IN}$ by the A/D converter 12, by a data compressing operation corresponding to each of the above mentioned modes of the CD-I system, and has the operating mode designated by the system controller 37.

In the present embodiment, the CD-DA mode digital audio data are converted into the B level stereo mode ADPCM audio data with the transfer rate of 18.75 (74/4) sectors/second by data compression to one fourth by the ADPCM encoder 43. The B level stereo mode ADPCM audio data, continuously outputted from the ADPCM encoder 43 at the transfer rate of 18.75 sectors/second, are supplied to a memory 44.

Data writing and reading to and from memory 44 is controlled by the system controller 37 so that the B level stereo mode ADPCM audio data supplied from the ADPCM encoder 43 are continuously written at the transfer rate of 18.75 sectors/second.

The B level stereo mode ADPCM audio data continuously written in the memory 44 at the transfer rate of 18.75 sectors/second are read out as recording data from memory 44 at the transfer rate of 75 sectors/- second in a burst fashion in the first recording mode, while being substantially read at the transfer rate of 18.75 sectors/second in the second recording mode.

The system controller 37 controls the memory 44 in such a manner that, in the first recording mode, a write pointer of the memory 44 is incremented at a transfer rate of 18.75 sectors/second to write the ADPCM audio data in the memory 44 at the transfer rate of 18.75 sectors/second and, when the amount of the ADPCM audio data stored in memory 44 exceeds a predetermined amount K, a read pointer of the memory 44 is incremented at a transfer rate of 75 sectors/second and the ADPCM audio data are read out as recording data in a burst fashion by a predetermined amount K at the above mentioned transfer rate of 75 sectors/second. The system controller also controls the memory 44 in such a manner that, in the second recording mode, the write pointer of the memory 44 is incremented at the transfer rate of 18.75 sectors/second to continuously write the ADPCM audio data in the memory 44 at the transfer rate of 18.75 sectors/second and, when the amount of the ADPCM audio data stored in memory 44 exceeds the predetermined value K, the read pointer of the memory 44 is incremented at a transfer rate of 18.75 sectors/second to continuously read the ADPCM audio data from memory 44 as recording data at the transfer rate of 18.75 sectors/second. The system controller 37 also generates an identification data ID, indicating the recording mode of the ADPCM audio data, by means of an ID generator 47.

The ADPCM audio data read out from memory 44, that is, the recording data, are supplied to an encoder 45, simultaneously with the identification data ID indicating the recording mode.

The encoder 45 processes the recording data supplied from memory 44 by error correction coding or EFM coding. The recording data coded by the encoder 45 are supplied to the magnetic head driving circuit 46.

The above mentioned magnetic head 34 is connected to the magnetic head driving circuit 46 which drives the magnetic head 34 for applying a modulated magnetic field conforming to the recording data to the magneto-optical disc 32.

The system controller 37 controls the memory 44 in the above described manner, while controlling the recording position for continuously recording the recording data read out from memory 44 on the recording track of the magneto-optical disc 32.

Figure 5:
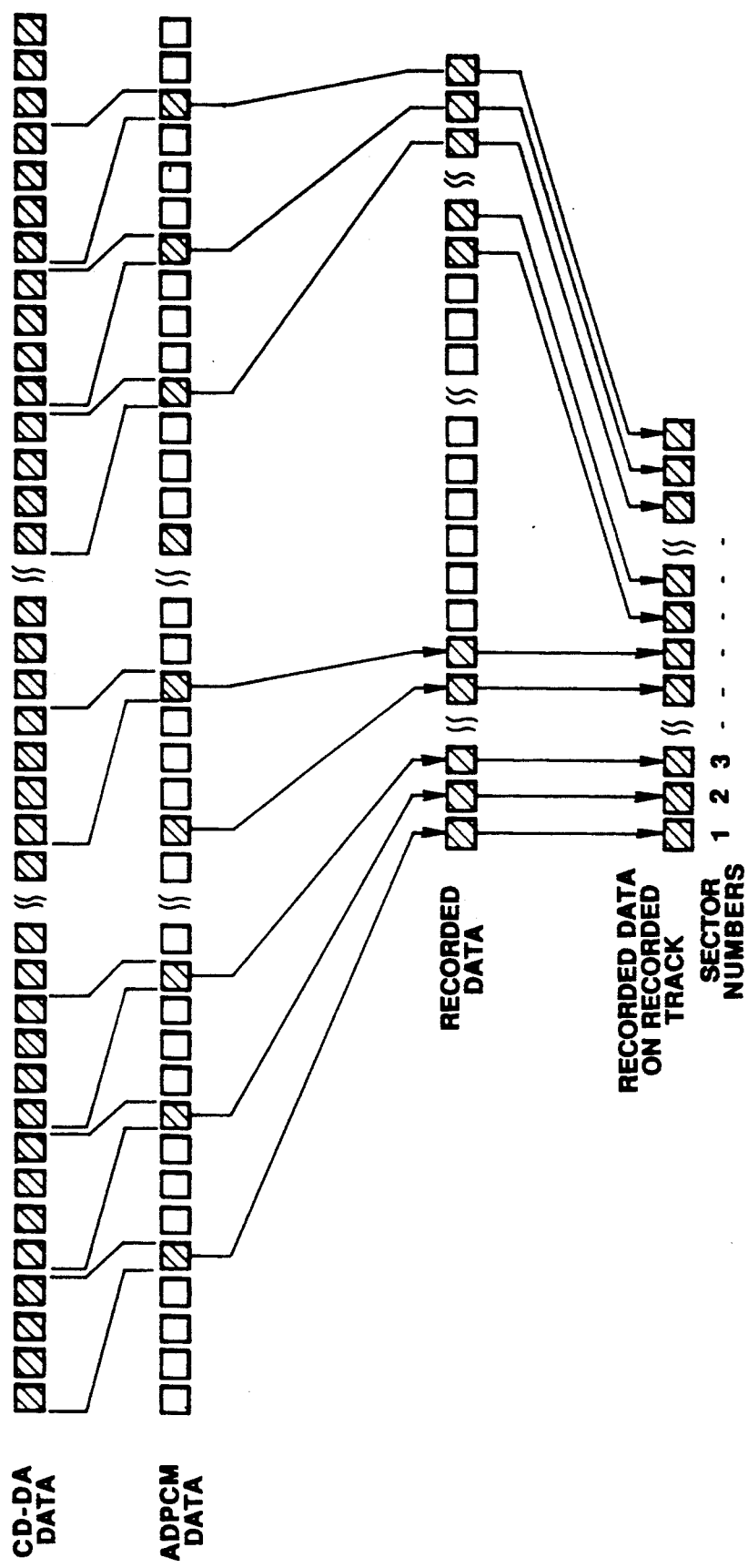
FIG. 5 is a view illustrating the operation of a first recording mode of recording data on a disc by a recording system of a disc recording/reproducing apparatus shown in FIG. 4.
Figure 6:
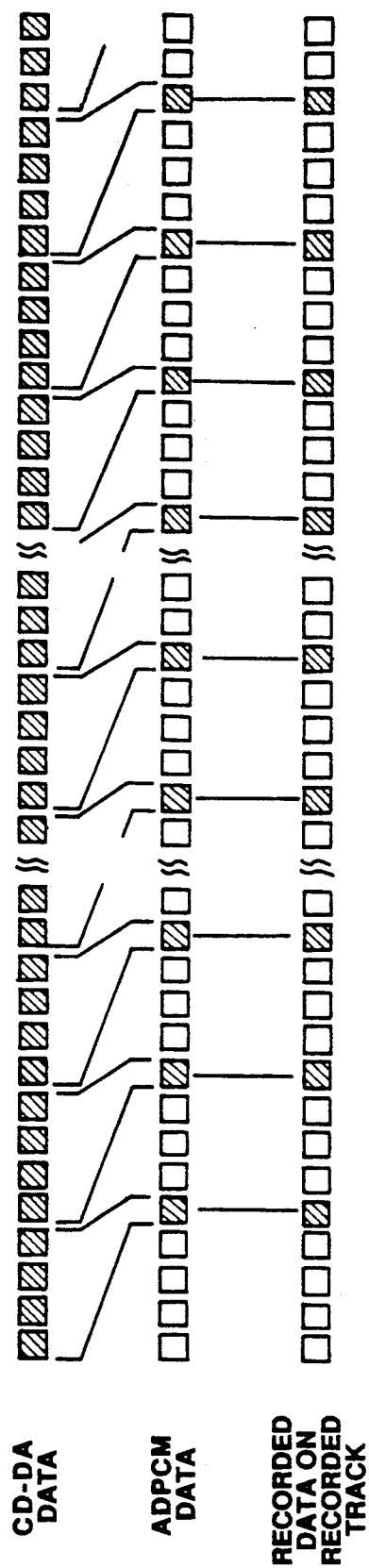
FIG. 6 is a view for illustrating the operation of a second recording mode for recording data on a disc by a recording system of the disc recording/reproducing apparatus shown in FIG. 4.

In controlling the recording position in the first recording mode, the recording position of the recording data read out in a burst fashion from the memory 44 is supervised by the system controller 37, and control signals designating the recording position on the recording track of the magneto-optical disc 32 is supplied to the servo control circuit 46. The same track is scanned four times, recording data are recorded once of the four times and the recording operation is terminated during the other three scanning periods, so that shifting to the next track position, that is, the record start position, occurs at the time the next recording data is recorded. In this manner, during the first record mode, the ADPCM audio data read out from memory 44, that is the record data, are recorded continuously, as shown in FIG. 5. In the first recording mode, the reproducing operation for reproducing data recorded immediately before cessation of the recording operation may be made during the three scanning periods when the recording operation is discontinued. In this manner, data may be recorded while the record confirmation or so-called verification is performed simultaneously. In the second recording mode, the ADPCM audio data or recording data read out sequentially by the system controller 37 from the memory 44 at the transfer rate of 18.75 sectors/second are directly recorded, as shown in FIG. 6. In the second recording mode, four channel data of the ADPCM audio data may be recorded multiplexedly.

The identification data ID, indicating the recording mode of the DPCM audio data, are recorded as table-of-contents data in a table-of-contents region of the magneto-optical disc 32, simultaneously with the region-designating data indicating the recording region.

In the recording system of the disc recording and/or reproducing apparatus, the ADPCM audio data continuously outputted from the ADPCM encoder 43 at the transfer rate of 18.75 sectors/second are written in the first recording mode in the memory 44 at the above described transfer rate of 18.75 sectors/second, in accordance with the above described memory control by the system controller 37. When the quantity of the ADPCM audio data stored in memory 44 exceeds a predetermined amount K, the predetermined amount K of the ADPCM audio data are read out in a burst fashion as the recording data at a transfer rate of 75 sectors/second, so that input data may be continuously written in the memory 44, while a data write region in excess of a predetermined quantity is assured at all times in the memory 44. The recording data read out in a burst fashion from the memory 44 may be recorded in a continuous state on a recording track of the magneto-optical disc 32 by controlling the recording position on the recording track of the magneto-optical disc 32 by the system controller 37. In addition, a data write region of a capacity in excess of a predetermined amount is procured at all times in the memory 44, so that, if the system controller 37 detects the occurrence of the track jump or the like due to disturbances or the like to discontinue the recording operation on the magneto-optical disc 32, input data may be written continuously in the data write region of the capacity in excess of the predetermined data amount, while simultaneously the resetting operation may be performed. Thus the input data may be recorded continuously on the recording track of the magneto-optical disc 32.

The reproducing system in the disc recording-reproducing apparatus will be hereinafter explained.

The reproducing system is adapted for reproducing data from the above mentioned magneto-optical disc 32 in which an area $AR_1$ and an area $AR_2$ where the ADPCM audio data are recorded by the above described recording system in the above described first and second recording modes, respectively, exist together, and in which identification data ID indicating the recording modes for the ADPCM data or recording data of these areas are recorded as table-of contents data in the table-of-contents area.

Figure 7:
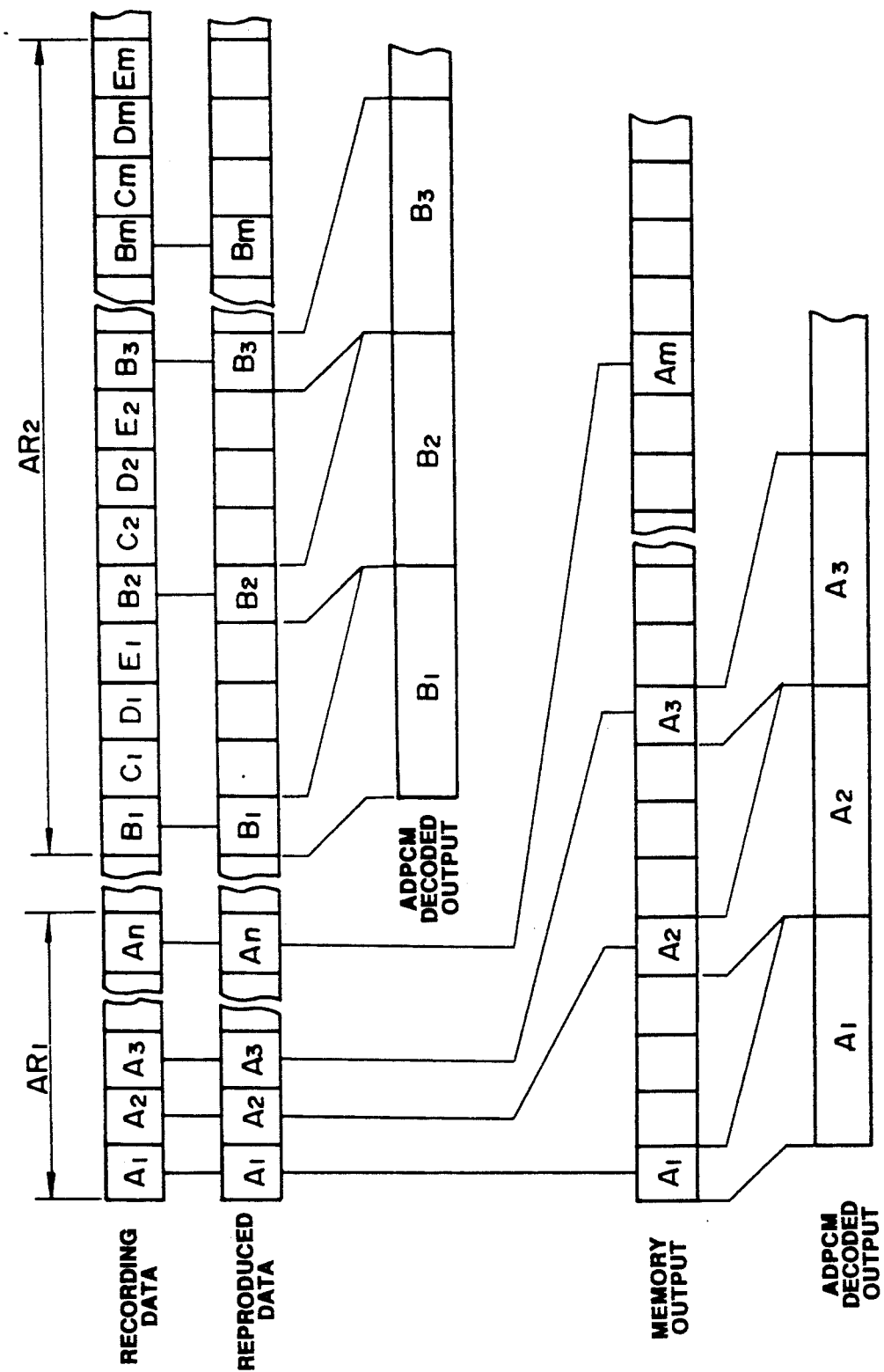
FIG. 7 is a view for illustrating the operation of a reproducing system of the disc recording/reproducing apparatus for reproducing data from a disc on which a region recorded with the first recording mode and a region recorded with the second recording mode exist together.

In the present embodiment, as shown in FIG. 7, ADPCM audio data $A_1, A_2, A_3, \ldots, A_n$ are continuously recorded in the area $AR_1$ in the above described first recording mode, whereas ADPCM audio data $B_1, B_2, B_3, \ldots, B_m$, ADPCM audio data $C_1, C_2, C_3, \ldots, C_m$, ADPCM audio data $D_1, D_2, D_3, \ldots, D_m$ and ADPCM audio data $E_1, E_2, E_3, \ldots, E_m$, are multiplexedly recorded in the area $AR_2$ in the above described second recording mode.

The reproducing system is provided with a decoder 51 to which is supplied a playback output produced by the optical head 33 tracing a recording track(s) of the magneto-optical disc 32 rendered into the binary form by the RF circuit 35.

The decoder 51, associated with the encoder 45 of the above described recording system, is adapted for processing the playback output, rendered into the binary form by the RF circuit 35, with a decoding for error correction, or an EFM decoding, for reproducing the above mentioned B level stereo mode ADPCM audio data. The reproduced data from the decoder 51 are supplied to a memory 52 and an ID detector 59.

The ID detector 59 detects the identification data ID, indicating the recording mode of the recording data, from data reproduced from the table-of-contents area of the magneto-optical disc 32, and supplies the detected data ID to the system controller 37.

The system controller 37 discriminates, on the basis of the identification data ID, detected by the ID detector 59, whether the reproduced data produced by the decoder 51 are those from the area $AR_1$ recorded in the above described first recording mode or those from the area $AR_2$ recorded in the above described second recording mode, for controlling the reproducing operation as a function of the results of discrimination.

That is, insofar as the reproduced data $A_1$, $A_2$, $A_3$, . . ., $A_n$, from the area $AR_1$, recorded in the above described first recording mode, are concerned, data reading and writing from and to memory 52 are controlled by the system controller 37, so that the reproduced data supplied from decoder 51 at the transfer rate of 75 sectors/second are written in the memory 52 in a burst fashion at the transfer rate of 75 sectors/second. Referring to FIG. 7, the reproduced data written in a burst fashion at the transfer rate of 75 sectors/second are continuously read out from memory 52 at the regular transfer rate for the B level stereo mode of 18.75 sectors/second and supplied to an ADPCM decoder 53.

Insofar as the multiplexed reproduced data [$B_1$, $C_1$, $D_1$, $E_1$, $B_2$, $C_2$, $D_2$, $E_2$, . . . , $B_m$, $C_m$, $D_m$, $E_m$] from the area $AR_2$ recorded in the above described second recording mode are concerned, the reproduced data [$B_1$, $B_2$, $B_3$, . . . , $B_m$], [$C_1$, $C_2$, $C_3$, . . . , $C_m$], [$D_1$, $D_2$, $D_3$, . . . , $D_m$] or [$E_1$, $E_2$, $E_3$, . . . , $E_m$], are produced by the decoder 51 on the channel-by-channel basis at the transfer rate of 18.75 sectors/second, and one-channel reproduced data, such as the reproduced data [$B_1$, $B_2$, $B_3$, . . ., $B_m$], are directly supplied to the ADPCM decoder 53 by means of memory 52 at the above mentioned transfer rate of 18.75 sectors/second.

Insofar as the reproduced data from the area $AR_1$ recorded in the above mentioned first recording mode are concerned, the system controller 37 controls the memory 52 in such a manner that a write pointer of the memory 52 is incremented at a transfer rate of 75 sectors/second to write the reproduced data in the memory 52 at the transfer rate of 75 sectors/second, at the same time that a read pointer of the memory 52 is incremented at the transfer rate of 18.75 sector/second to continuously read the reproduced data from the memory 52 at the transfer rate of 18.75 sectors/second and, when the write pointer overtakes the read pointer, writing is discontinued, with the write pointer of the memory 52 being incremented at the transfer rate of 75 sectors/second so as to effect writing when the amount of the reproduced data stored in the memory 52 is decreased to less than the predetermined amount L. Insofar as the reproduced data from the area $AR_2$ recorded in the above mentioned second recording mode are concerned, the system controller 37 controls the memory 52 in such a manner that the write pointer of the memory 52 is incremented at the transfer rate of 18.75 sectors/second to continuously write ADPCM audio data in the memory 52 at the transfer rate of 18.75 sectors/second and, as soon as the amount of the ADPCM audio data stored in the memory 52 reaches a predetermined value, the read pointer of the memory 52 is incremented at the transfer rate of 18.75 sectors/second to read out the ADPCM audio data from the memory 52 continuously as reproduced data at the above mentioned transfer rate of 18.75 sectors/second.

The system controller 37, which controls the memory 52 in the above described manner, also controls a reproducing position in such a manner that the reproduced data written in a burst fashion from the memory 52 by such memory control are continuously reproduced from the recording track of the magneto-optical disc 32.

Insofar as the reproduced data from the area $AR_1$ recorded in the above described first recording mode are concerned, the control of the reproducing position is performed in such a manner that, by supplying a control signal designating the reproducing position on the recording track of the magneto-optical disc 32 to the servo control circuit 36, the same track is scanned four times and data are read out by one such scanning, and that the data reading operation is discontinued during the other three scanning periods to shift the head to the next track on readout start position at the time of reading and reproducing the data of the next track. In this manner, data may be read continuously from the recording track of the region $AR_1$ of the magneto-optical disc 32 in the first recording mode. The reproduced data from the area $AR_2$ recorded in the above mentioned second recording mode are sequentially read from the recording track on the magneto-optical disc 32 at the above mentioned transfer rate of 18.75 sectors/second.

The B level stereo mode ADPCM audio data, obtained as reproduced data read out continuously from memory 52 at the transfer rate of 18.75 sectors/second, are supplied to an ADPCM decoder 53.

The ADPCM decoder 53, corresponding to the ADPCM decoder 13 of the recording system, has its operating mode designated by the system controller 37 and, in the present embodiment, reproduces digital audio data by expansion of the B level stereo mode ADPCM audio data by a factor of four. The digital audio data are supplied by ADPCM decoder 53 to a D/A converter 54.

The D/A converter 54 processes the digital audio data supplied from the ADPCM decoder 53 by digital to analog conversion to form analog audio signals $A_{OUT}$. The analog audio signal $A_{OUT}$, obtained by the D/A converter 54, is outputted at an output terminal 56 by means of a low-pass filter 55.

It is noted that the reproducing system of the disc recording-reproducing apparatus of the present embodiment also has a digital output function such that digital audio data are outputted by the ADPCM decoder 53 at a digital output terminal 58 as a digital audio signal $D_{OUT}$ by means of a digital output encoder 57.

In the reproducing system of the disc recording/reproducing apparatus, the B level stereo mode ADPCM audio data reproduced from the recording track of the magneto-optical disc 32 are written in the memory 52 in a burst fashion at the transfer rate of 75 sectors/second, and the ADPCM audio data are read out continuously from memory 52 as reproduced data at the transfer rate of 18.75 sectors/second, thanks to the above described memory control by the system controller 37, so that the reproduced data may be read continuously from memory 52 while a data reading area of a capacity in excess of a predetermined amount L is procured within the memory 52. On the other hand, the reproduced data read is a burst fashion from the memory 52 may be reproduced continuously from the recording track of the magneto-optical disc 32 by controlling the reproducing position on the recording track of the magneto-optical disc 32 by the system controller 37. In addition, the data readout area of a capacity in excess of the predetermined amount L is procured at all times in the memory 52, so that, even though the system controller detects the occurrence of a track jump, for example, due to disturbances or the like, and the reproducing operation from the magneto-optical disc 32 is discontinued, the reproduced data may be read from the data reading area of the capacity in excess of the predetermined amount L to continue the outputting of the analog audio signals, while the restoring operation may be performed in the interim.

Although the disc recording and/or reproducing apparatus has been described with reference to recording and reproduction of the B level stereo mode ADPCM audio data, ADPCM audio data of other modes of other CD-I systems may be similarly recorded or reproduced and, by recording ADPCM audio data compression rate data as the identification data ID in the table-of-contents area, ADPCM audio data of the respective modes may also be recorded or reproduced.

It is noted that the identification data ID may also be annexed to the recording data and recorded in this state, instead of being recorded as the table-of-contents data in the table-of-contents area.

What is claimed is:

1. A data recording method for recording data on a recording medium comprising
   generating at least a predetermined amount of compressed data by generating means,
   storing said compressed data in memory means, said compressed data being continuous data compressed in time,
   continuously and repetitively reading a predetermined amount of the compressed data stored in said memory means and recording the data so read on a first area of the recording medium by a recording head,
   discontinuing the operation of data recording on said recording medium by said recording head after said predetermined amount of compressed data has been recorded, and
   resuming data recording on said recording medium of a further predetermined amount of said compressed data stored in said memory after a time interval sufficient for said generating means to generate a further predetermined amount of said compressed data, said resumed recording effective to record said further predetermined amount of compressed data on said recording medium at the area thereof adjacent to the said first area.

2. The data recording method according to claim 1 comprising using a disc-shaped recording medium as said recording medium,
   supplying at a predetermined transfer rate compressed data to said recording head by means of said memory means, said compressed data being continuous data compressed in time by 1/N, corresponding to the transfer rate of said compression data.

3. The data recording method according to claim 1 or 2 wherein said recording head is shifted to a new recording start position on said recording medium when again performing data recording after discontinuing data recording on said recording medium.

4. The data recording method according to claim 3 wherein said recording head scans the same track during the time when the operation of data recording on said recording medium by said recording head is discontinued.

5. The data recording method according to claim 4 wherein the predetermined amount of the compressed data read out from said memory means is approximately an amount recorded on one track.

6. The data recording method according to claim 3 wherein data recorded on said recording medium are reproduced during the time when the operation of data recording on said recording medium is discontinued.

7. The data recording method according to claim 6 wherein the said data which is reproduced are data continuously recorded immediately before said operation of data recording is discontinued.

8. A data recording method for recording data on a recording medium comprising
   generating at least a predetermined amount of compressed data by generating means,
   performing a data recording by switching a recording mode between a first recording mode and a second recording mode,
   said first recording mode being a recording mode in which said compressed data which are continuous data compressed in time are stored in memory means,
   reading out continuously and repetitively a predetermined amount of said compressed data stored in said memory means and supplying it to a recording head so as to record said data on said recording medium,
   discontinuing recording on said recording medium after said predetermined amount of said compressed data is stored on said recording medium, until said memory means stores a further predetermined amount of said compressed data, and
   resuming said recording of said further predetermined amount of said compressed data on said recording medium at a location of said recording medium adjacent that upon which is stored the predetermined amount of said compressed data,
   said second recording mode being a recording mode in which the compressed data which are continuous data compressed in time are directly supplied to said recording head for recording on said recording medium, and
   recording identification data indicating the recording mode for each the compressed data.

9. The data recording method according to claim 8 comprising using a disc-shaped recording medium as said recording medium,
   supplying compressed data to said recording head by means of said memory means, said compressed data being continuous data compressed in time by 1/N, and recording data on said disc-shaped recording medium.

10. The data recording method according to claim 8 or 9 further comprising shifting said recording head to a new recording start position on said recording medium in said first recording mode when performing an operation of data recording again after the operation of data recording on said recording medium is discontinued.

11. The data recording method according to claim 10 wherein said identification data also indicate a compression ratio of said compressed data.

12. The data recording method according to claim 10 wherein said recording head scans the same track when the operation of data recording on said recording medium is discontinued in said first recording mode.

13. The data recording method according to claim 12 wherein the predetermined amount of the compressed data read out from said memory means in said first recording mode is approximately an amount recorded on one track.

14. The data recording method according to claim 10 wherein data already recorded on said recording medium are reproduced in said first recording mode during the time when the operation of data recording on said recording medium is discontinued.

15. The data recording method according to claim 14 wherein data reproduced during the time when the operation of data recording on said recording medium is discontinued in the first recording mode constitutes the data which was continuously recorded immediately before the data recording is discontinued.

16. A data reproducing method for reproducing data from a recording medium on which compressed data compressed in time are recorded continuously, comprising repetitively scanning said recording medium by a reproducing head for reading out compressed data, expanding a predetermined amount of the compressed data thus read out in time and outputting said expanded data, discontinuing said reading operation of the compressed data from said recording medium after said predetermined amount of compressed data has been read out, and resuming scanning compressed data from said recording medium at the area of said recording medium adjacent the area from which said predetermined amount of compressed data was read out.

17. The data reproducing method according to claim 16 comprising using as said recording medium a disc-shaped recording medium on which compressed data which are continuous data compressed by 1/N in time, are continuously recorded, reproducing at a predetermined transfer rate data from said disc-shaped recording medium.

18. The data reproducing method according to claim 16 or 17 wherein said reproducing head is shifted to a new recording start position on said recording medium when the reading operation is again performed after the reading operation from said recording medium is discontinued.

19. The reproducing method according to claim 18 wherein said reproducing head scans the same track during the time when the reading operation from said recording medium is discontinued.

20. The data reproducing method according to claim 19 wherein said predetermined amount of the compressed data read out from said recording medium is approximately an amount recorded on one track.

21. A data reproducing method for reproducing data from a recording medium on which a first area of said recording medium has thereon recorded data which constitutes compressed data compressed in time recorded continuously on said recording medium, and a second area of said recording medium at which is recorded compressed data in a burst fashion, said recording medium having recorded thereof identification data indicating the recording mode for the compressed data for said first and second areas comprising repetitively scanning said recording medium by a reproducing head for reading out the compressed data and storing the compressed data thus read out in memory means, expanding a predetermined amount of the compressed data stored in said memory means in time and continuously outputting said expanded data, detecting identification data for the compressed data thus read out, discontinuing the operation of writing said compressed data in said memory means when a predetermined amount of said compressed data stored in said first recording means on said record medium are stored in said memory means, and resuming said writing the compressed data in said memory means of said compressed data which is read from said recording medium at a location adjacent the location from which the first said predetermined amount of said compressed data was read.

22. The data reproducing method according to claim 21 comprising using a disc-shaped recording medium on which are recorded compressed data which are continuous data compressed by 1/N as said recording medium, and reproducing at a predetermined transfer rate data from said disc-shaped recording medium.

23. The data reproducing method according to claim 21 or 22 further comprising shifting said reproducing head to a new recording start position on said recording medium when a write operation is performed again after the operation of writing the compressed data in said memory means is discontinued.

* * * * *